(12) United States Patent
Ledet

(10) Patent No.: US 10,554,597 B1
(45) Date of Patent: *Feb. 4, 2020

(54) MESSAGE MANAGEMENT AND MESSAGE MODIFICATION APPLICATION

(71) Applicant: OPEN INVENTION NETWORK LLC, Durham, NC (US)

(72) Inventor: David Gerard Ledet, Allen, TX (US)

(73) Assignee: OPEN INVENTION NETWORK LLC, Durham, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/261,493

(22) Filed: Jan. 29, 2019

Related U.S. Application Data

(63) Continuation of application No. 14/813,833, filed on Jul. 30, 2015, now Pat. No. 10,193,835.

(51) Int. Cl.
*G06F 15/16* (2006.01)
*H04L 12/58* (2006.01)

(52) U.S. Cl.
CPC ............ *H04L 51/063* (2013.01); *H04L 51/14* (2013.01)

(58) Field of Classification Search
CPC ............................ H04L 51/063; H04L 51/14
See application file for complete search history.

(56) References Cited

U.S. PATENT DOCUMENTS

| | | | |
|---|---|---|---|
| 7,068,610 B2 | 6/2006 | Unruh | |
| 7,159,039 B1 | 1/2007 | Hahn et al. | |
| 7,660,873 B2 | 2/2010 | Fisher et al. | |
| 8,191,005 B2 | 5/2012 | Baier et al. | |
| 2004/0156360 A1 | 8/2004 | Sexton et al. | |
| 2010/0199188 A1* | 8/2010 | Abu-Hakima | ...... H04L 12/1895 715/733 |
| 2013/0018867 A1* | 1/2013 | Regan | ...... G06F 9/445 707/707 |
| 2014/0173085 A1 | 6/2014 | Gupta | |
| 2014/0370879 A1* | 12/2014 | Redding | ........... H04M 3/42178 455/419 |
| 2015/0019910 A1 | 1/2015 | Simon et al. | |

\* cited by examiner

*Primary Examiner* — Sm A Rahman

(57) ABSTRACT

Identifying messages transferred to and from a mobile user device may provide a way to monitor message transfers. One example method of operation includes receiving a message from a user device, processing the message to identify message content, determining whether the message should be modified based on the message content, and determining whether the message should be transmitted to its intended destination based on the message content.

20 Claims, 11 Drawing Sheets

MESSAGE MANAGEMENT AND MESSAGE MODIFICATION APPLICATION

TECHNICAL FIELD OF THE APPLICATION

This application relates to information management and customization and more particularly to identifying and modifying user messages.

BACKGROUND OF THE APPLICATION

Software defined networking (SDN) is an approach to computer networking that permits network administrators to manage network services through the abstraction of lower level functionality. For example, this abstraction is accomplished by decoupling the functionality that would normally make decisions about where traffic is sent (i.e., the control plane) from the underlying layers that forward traffic to the selected destination (i.e., the data plane).

In one example, when a packet arrives at a conventional networking switch, predefined rules instruct the switch where to forward the packet. In general, every packet may be sent to the same destination and along the same path thus treating all similar packets in the same manner. However, the goal of SDN is to enable network engineers and administrators with the ability to shape traffic from a centralized control console without having to interact with the individual switches. The shaping of traffic includes prioritizing, de-prioritizing and blocking specific types of packets at a granular level of control.

SDN implementations are emerging architectures that offer dynamic, manageable, cost-effective, and adaptable approaches for the high-bandwidth, dynamic nature of today's applications. SDN architectures decouple network control and forwarding functions, enabling network control to become directly programmable and the underlying infrastructure to be abstracted from applications and network services.

SUMMARY OF THE APPLICATION

One example embodiment may provide a method that includes at least one of receiving a message from a user device, processing the message to identify message content, determining whether the message should be modified based on the message content, and determining whether the message should be transmitted to its intended destination based on the message content.

Another example embodiment may include an apparatus that includes a receiver configured to receive a message from a user device, and a processor configured to perform at least one of process the message to identify message content, determine whether the message should be modified based on the message content, and determine whether the message should be transmitted to its intended destination based on the message content.

Another example embodiment may include a non-transitory computer readable storage medium configured to store instructions that when executed causes a processor to perform at least one of receiving a message from a user device, processing the message to identify message content, determining whether the message should be modified based on the message content, and determining whether the message should be transmitted to its intended destination based on the message content.

Another example embodiment includes a method configured to include at least one of receiving a message from a user device at a network server, processing the message to identify message content, identifying a current event being hosted by the network server, and determining a message priority to assign to the message based on the message content and the current event.

Yet another example embodiment includes an apparatus including a receiver configured to receive a message from a user device at a network server and a processor configured to process the message to identify message content, identify a current event being hosted by the network server, and determine a message priority to assign to the message based on the message content and the current event.

Still yet another example embodiment includes a non-transitory computer readable storage medium configured to store instructions that when executed cause a processor to perform at least one of receiving a message from a user device at a network server, processing the message to identify message content, identifying a current event being hosted by the network server, and determining a message priority to assign to the message based on the message content and the current event.

DETAILED DESCRIPTION OF THE APPLICATION

Figure 1:
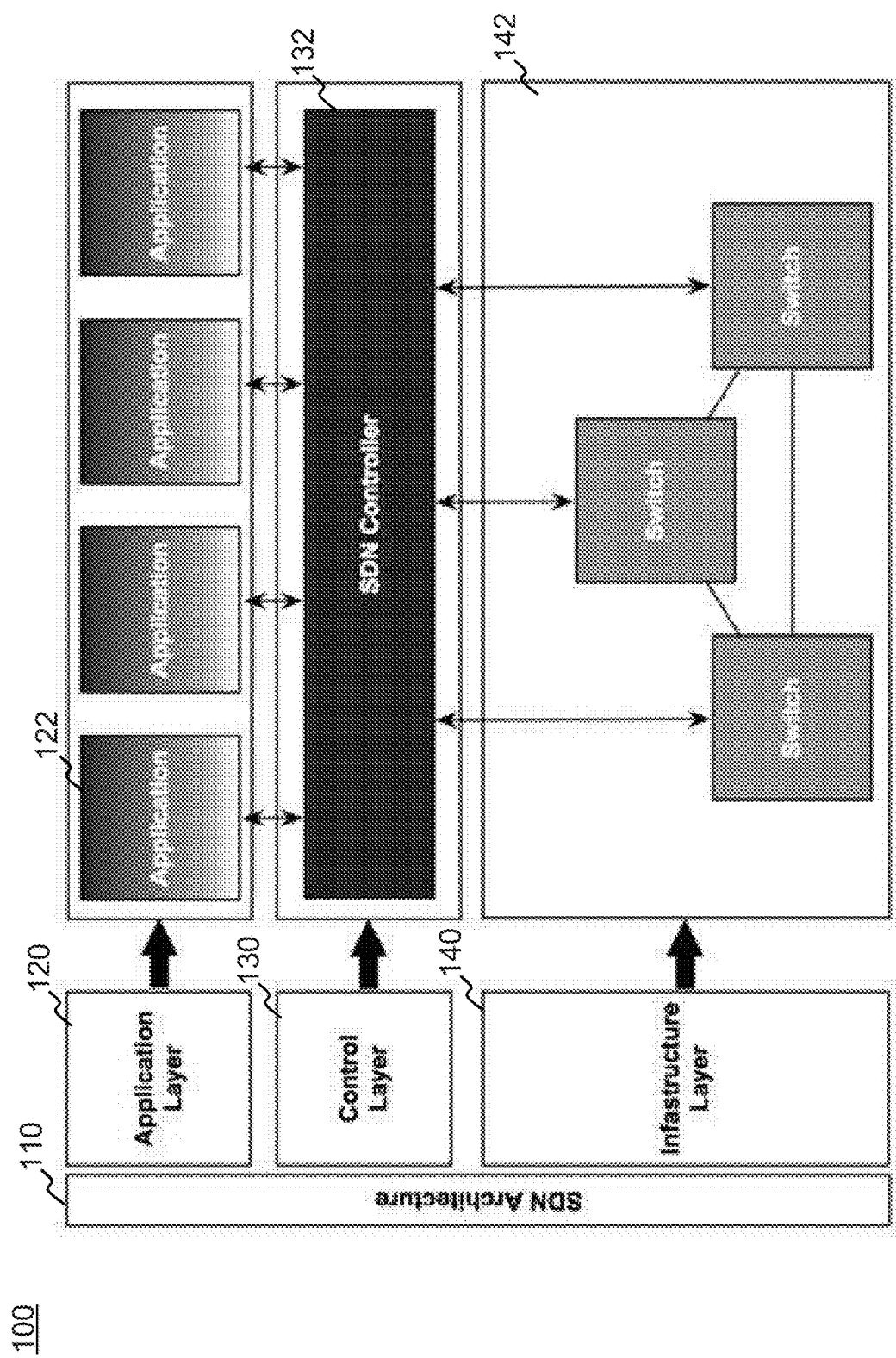
FIG. 1 illustrates a SDN system architecture diagram according to an example embodiment of the present application.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments of the present application provide an application that utilizes user's characteristics and/or interests in order to provide requested and unrequested input. The application parses the messages identified both incoming and outgoing from the user's device and can interact with other entities to obtain information that enhances the known information in the messages identified to provide alternate, additional, or less information to the user. For example, the messages may have a foundational set of characteristics, such as data content, origination address, destination address, etc. However within the core content of the message may be data types, data formats, requests, commands, etc. which could lead the application processing modules to extract additional message characteristics for enhanced processing functions. The application may examine the message and obtain an understanding of the user's characteristics and interests, and examples provide a granular approach to the functionalities of the application.

The foundational block diagram of FIG. 1 provides a basic SDN architecture configured to perform network traffic manipulation according to example embodiments. Referring to FIG. 1, the diagram 100 includes a main SDN architecture 110 with three sub-components or modules including the application layer 120, the control layer 130 and the infrastructure layer 140. The application layer 120 may process various different applications 122 which are linked to the SDN controller 132. The data input and output of each of the applications 122 corresponds to a number of switches 142 configured to receive the message forwarding and receiving operations commanded by the SDN controller 132.

Figure 2:
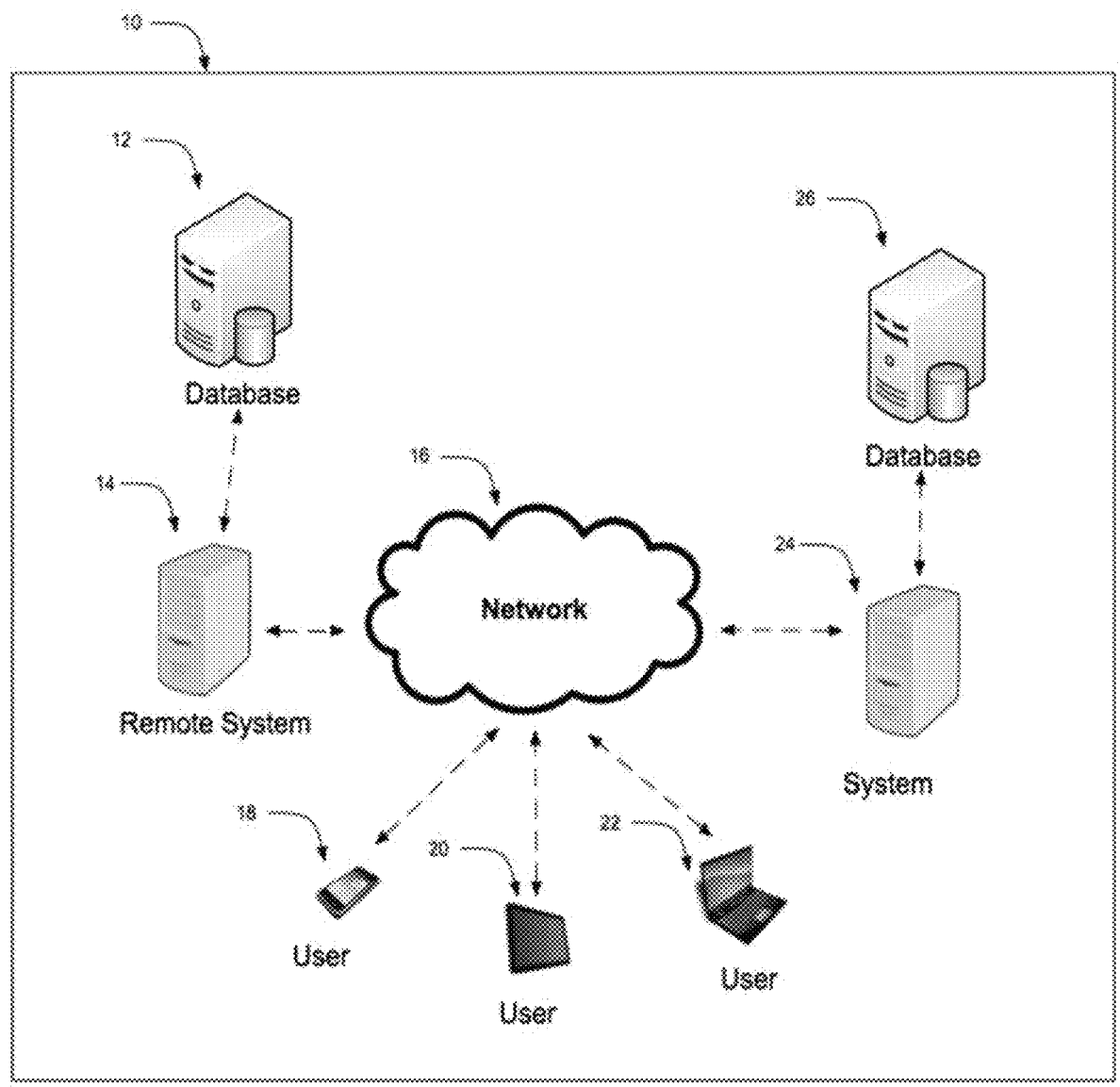
FIG. 2 illustrates a network configuration according to an example embodiment of the present application.

FIG. 2 illustrates a system diagram according to example embodiments. Referring to FIG. 2, a network diagram 10 of the present application permits a user utilizing a mobile client machine 18, a tablet computer 20, a laptop or desktop computer 22 to download from the system server 24 an application to be installed. A client's device may alternatively be a gaming system, a DVD player, or any other device that contains a processor and memory. The present application in the form of software, for example can alternately reside on the client's device 18/20/22 and can be any of a mobile laptop device and/or a personal desktop computer or a mobile device. The computing device 18/20/22 is connected to the network 16, which may be the Internet or any other type of network, through wired or wireless communication. It should be noted that other types of devices, in addition to devices 18/20/22, might be used with the present application. For example, a PDA, an MP3 player or any other wireless device, a gaming device, such as a hand held system or home based system and the like including a P.C. or other wired device that can also transmit and receive information could be used with the present application.

The user of the application can interface with the client device 18/20/22 and connect through the network 16 to the system server 24. The system server 24 can be redundant, or be more than a single entity without deviating from the scope of the application. A database 26 is directly connected to the system server 24 or connected remotely through the network 16 without deviating from the scope of the application.

A remote system server 14 communicates with the network 16. The remote system server 14 can be redundant, or be more than a single entity without deviating from the scope of the application. A database 12 is directly connected to the remote system server 14 or connected remotely through the network 16 without deviating from the scope of the application. The user-database can reside in the system server 24, or the database server 26 either directly connected to the system server 24 or remotely through the network 16.

The application of the current application resides completely or partially on the user's device 18/20/22, which can be a mobile device, but can also reside on a user's desktop computer, a personal digital assistant (PDA), tablet computer, or any other device containing a processor, memory, and an operating system. In addition, the application of the current application can reside on either completely or partially on any one of the other elements in the system illustrated in FIG. 1.

If the application of the current application resides on a device, the application of the current application is downloaded through a platform, such as an application store or market residing on the device or accessed via the device, or may be accessed through the device's browser communicably coupled to the network 16. Further, the application of the current application can be pre-loaded on the device. The current application may operate with any device such as a personal computer with a touch screen, a laptop with a touch screen, a personal computing tablet, a smartphone, a PDA or any device with a processor, memory and a touch screen.

Figure 3:
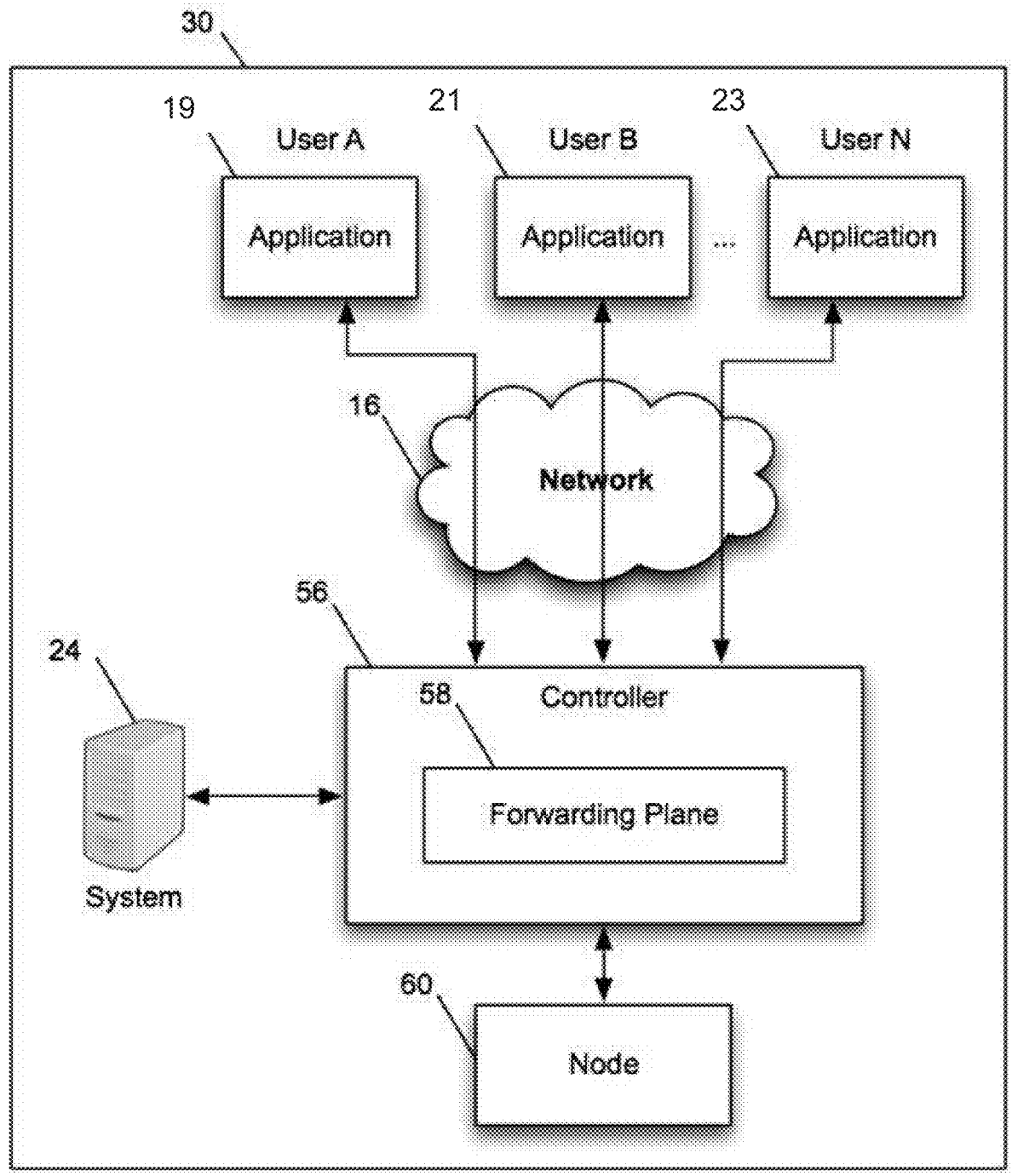
FIG. 3 illustrates a logic diagram of an application architecture according to an example embodiment of the present application.

FIG. 3 illustrates a logic diagram 30 of the application configuration of the present application. The various applications 19, 21 and 23 are correlated with the various user devices 18, 20 and 22 of FIG. 2 as like reference numerals refer to like elements in the various drawings. The controller 56 is an element in the network containing a processor and memory, and may be implemented in any element in the diagram 10, for example, the system server 24, the remote system 14, or the databases 12/26. The controller 56 is responsible for controlling the flow of a subset of information to and from the users (18/20/22). The forwarding plane 58 is responsible for the parsing and filtering the incoming and/or outgoing data. In one embodiment, the forwarding plane 58 can reside inside the controller 56. In another embodiment, the forwarding plane 58 can reside outside the controller 56.

The controller 56 is connected directly or through the network 16 to the system server 24. In another embodiment, user A 18, user B 20 and user 'N' 22 are utilizing the same present application through different devices. In another embodiment and as example only, the application 18/20/22 can be connected to the controller 56 without the network 16. In another embodiment, the node 60 can be communicably coupled to the controller 56 connected through the network 16.

Figure 4:
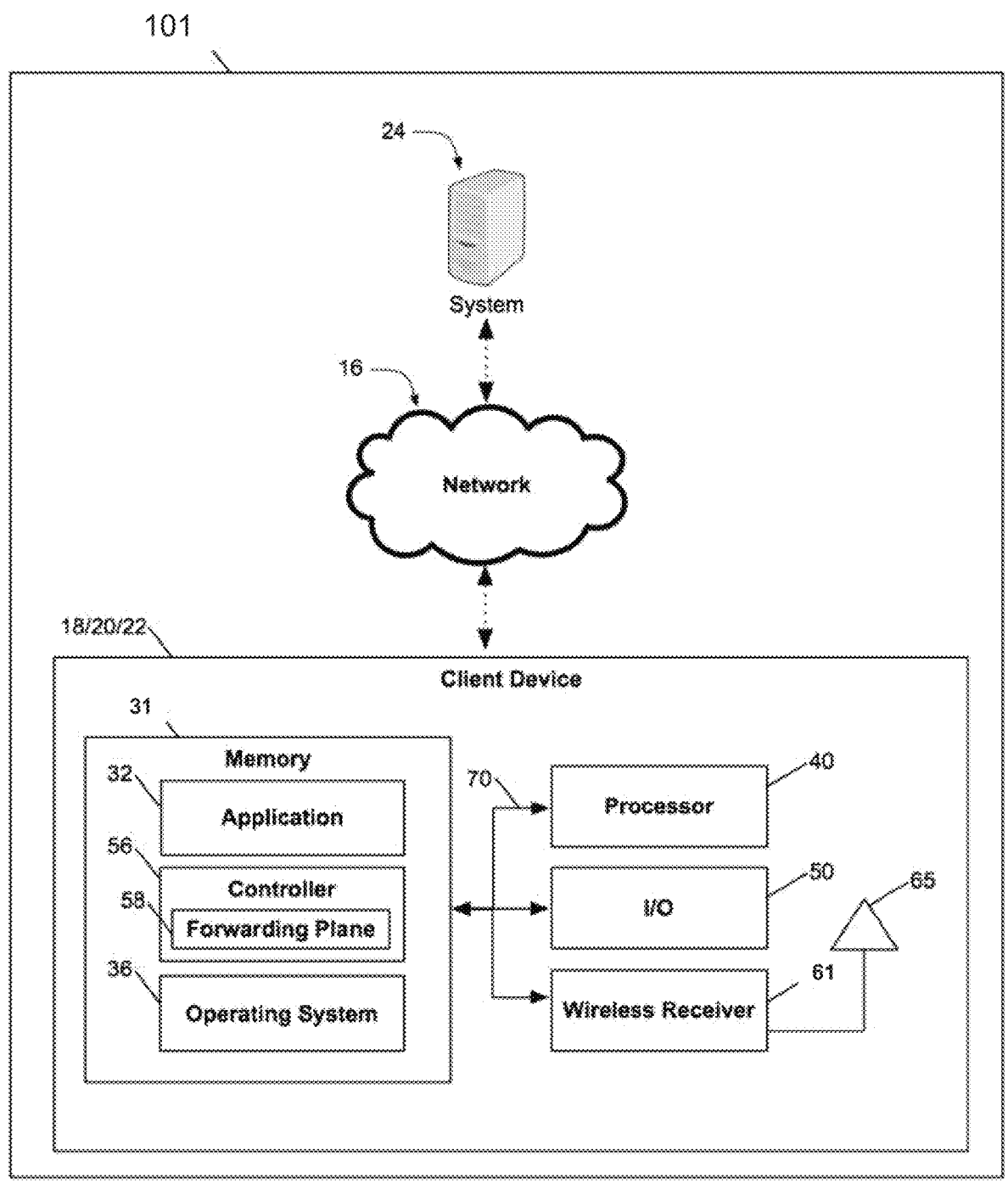
FIG. 4 illustrates an example client device configuration according to an example embodiment of the present application.

FIG. 4 is an example configuration 101 of the controller being part of the client device. Client device 18/20/22 preferably includes microprocessor 40, memory 31, input/output (I/O) components 50, wireless receiver 61 and antenna 65. In an example embodiment, these components of mobile device 18/20/22 are coupled for communication with one another over a suitable bus 70. Memory 31 is preferably implemented as non-volatile electronic memory, such as random access memory (RAM) with a battery back-up module (not shown) such that information stored in memory 31 is not lost when the power to client device 18/20/22 is shut down. A portion of memory 31 is preferably allocated as addressable memory for program execution, while another portion of memory 31 is preferably used for storage, such as to simulate storage on a disc drive. Memory 31 includes operating system 36, one or more application program(s) 32, such as a personal information manager or PIM as well as a controller 56. A forwarding plane 58 exists in the controller 56. During operation, operating system 36 is preferably executed by processor 40 from memory 31. I/O components 50 are provided to facilitate input and output operations from a user of client device 18/20/22. The client device 18/20/22 is coupled to the network 16.

In operation, the sent and/or received data to and from a user device 18/20/22 of the current application 32 is either sent out, or received by the application 32. The messages are "filtered" through the controller 56 via certain filtering criteria. The controller 56 communicates with the system server through the network 16. Unfiltered or 'raw data' can potentially be a duplicate of previously received information, or information that the user may not be interested in pursuing due to various reasons. This application filters and examines incoming and outgoing information that may be considered uninteresting to the user or the recipients of the outgoing information.

Figure 5:
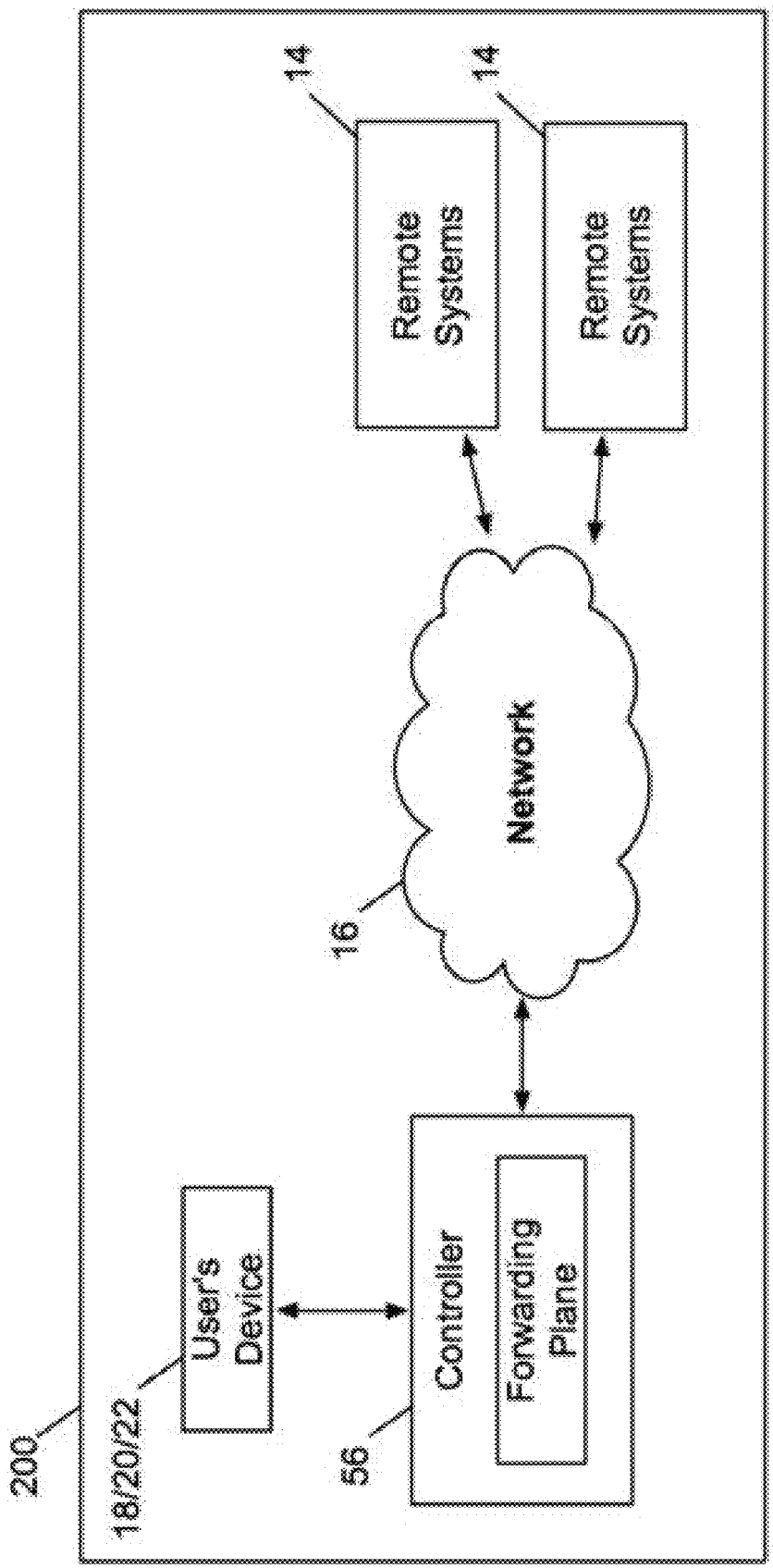
FIG. 5 illustrates another example logic diagram according to example embodiments of the present application.

FIG. 5 illustrates an example configuration 200 of the controller being outside the client device 18/20/22. Referring to FIG. 5, the controller 56 is across the network from the remote system servers 14 and the user's device as depicted by the network 16 and the other network elements. The client device 18/20/22 interacts with the controller 56 so message(s) are first passed through the controller 56 before being sent to the network 16 for outgoing messages or sent to the client device 18/20/22 for incoming messages.

In an example where further information is sought, the controller 56 accesses remote systems devices 14 through the network 16. The remote system devices 14 may be functionally setup via an application program interfaces (API). Using the APIs or a similar interaction, the controller 56 may obtain information that offers additional input that may be sent to the client device 18/20/22 without the user directly requesting additional information. The remote system devices 14 may be any remote element in the network containing a processor and memory, and which is coupled to the network 16 through any communication protocol normally utilized in communication between a computer and a network.

To provide a procedure of analyzing classifying and/or controlling outgoing and incoming messages, a message gateway or 'controller' 56 may process all such outgoing messages by filtering such messages before leaving the organization. This permits some control over the messages from an organization and validates the messages being delivered to the network. In operation, messages are "captured" in the controller 56 prior to being transmitted. Once captured by the controller 56, the messages are compared to previously delivered messages to verify that the outgoing messages are different from the previously logged messages. Other procedures may include determining the messages are similar but from a different sender/receiver and/or whether the messages are provided in a different format.

Messages captured may be compared to those that were previously received and compared against those that are considered "real time" and those that are considered historical messages. In one embodiment, a predetermined value is set to determine which messages are real-time messages and which are historical messages (e.g., 2, hours, 4 hours, etc.).

Incoming information may be delivered to the user such that the information is optimized to be of a greater level of interest to the user than would normally be received. This information may be from other people/users or generated from the system server 24 based on interaction between the system server 24 and the controller 56/forwarding plane 58. The system server 24 may analyze the information being received and determine that the information is a duplicate of already received information, or determine that other related information would be more useful to the user as the preferences and characteristics of the user are identified.

The controller 56 is responsible for handling the messaging both incoming and outgoing to the client device 18/20/22. Messages are sent through the controller and pre-processed prior to being transmitted. Once processed, the messages are either sent up to the client device 18/20/22 or to the network 16 or node 60 of FIG. 3. In one example embodiment, data contained in the controller 56 may contain more real-time data than historical data as compared to the system/DB 24/26 which may contain more historical data. The controller 56 decides how to respond to users by analyzing the incoming messages and interacting with the previous messages and other data stored in a coupled element, such as the system server 24. The forwarding plane 58 may be located inside the controller 56. This element is responsible for forwarding the message(s) to obtain more information.

When processing the data in the forwarding plane 58, the controller 56 can queue the data for use at a later time, forward the data to another network element, delete the data, alter and/or augment the data (i.e., add, replace, reword, include image/video from a data source) prior to transmitting the data to its intended destination. In operation, the data the user is transmitting may be modified based on user preferences, user characteristics and other user based criteria prior to transmitting the data from the user device.

The application may perform certain operations in order to understand the user. This understanding relates to not only the interests of the user, but the normal interactions between the user and other people. For example, interest groups, such as other people in the user's organization, work environment or other people in other work environments. The current application may determine the user's characteristics and interests and how the user interacts with others through interactions (i.e. messaging, applications, etc.).

The application can gain an understanding of the user by examining any or all of information that has been received by the user device, such as when the user is online, advertisement information that the user may have selected on a user interface, searches submitted and information requested, groups that the user has obtained member, emails that the user sent or received, calendar events currently subscribed to the user, historical web surfing habits stored in web history locations, a current location of the user as obtained from IP address, GPS, or other location functions, online games that the user has accessed, digital video recordings (DVR) programs, live video streaming/Internet protocol television (IPTV), web-based shows, television-based shows, radio/music platforms/music applications/music players, GPS, cellular/mobile device usage, etc.

In one example, the user's history of online web access may include the web history stored in a web history file on the user's device and data stored in the network 16. All the web browsers retain Internet surfing information in the form of files stored on the user's device. These web history files can be processed to determine information that can aid the application in delivering messages related to the user. For example, a request initiated by a user device may reference the web history file for additional information and may include such additional information or at least cross-reference the information in the request message to confirm or add additional information based on information in the web history file.

Other options can be employed to gain an understanding of the user's previous Internet surfing history. For instance, GOOGLE and YAHOO, offer free services that can be utilized to perform email capabilities, manage groups, search the web, manage information, such as advertisements, manage calendar activities, manage documents, as well as many other services. This approach differs substantially from the conventional approaches since the current application provides the ability to create/modify messages based on information that has appeared in the user's information sources.

In another embodiment of the current application, the application can continue to monitor the user's information and provide updates to the search results reflecting changes in the user, such as the user device location or newly identified interests. The user's data results from the user's local data files (i.e., tracking files) or client device 18/20/22 can be weighed against the user's data results returned from the remote system server 14 so the weighing operation can determine a priority of the results. The remote system server 14 can include information pertaining to the user and stored in the cloud or network 16. When obtaining the user's data, the latest data with a most current timestamp can be given a higher weight than older data.

Messages that are incoming to the client device 18/20/22 are received from the network 16. These messages can be originated from services, such as message-based services or directly from other users. Example messages types and formats may include: short message service (SMS), IMESSAGE—Apple proprietary messaging, extensible messaging and presence protocol (XMPP), MICROSOFT messenger service, YAHOO! messenger protocol, SKYPE protocol, SIMPLE instant messaging protocol, TWEET from TWITTER, smart message, multimedia messaging service (MMS), email, Internet protocol messages (IP), voice over IP (VOIP), primary rate interface messages (PRI), signaling system No. 7 messages (SS7), common channeling signaling (CCS), ISDN user part messages (ISUP).

The messages are received and processed by the controller 56 of the client device 18/20/22. The controller 56 filters out incoming messages in the device prior to sending them to the executing application to handle the incoming message. In one embodiment, the incoming message is analyzed to determine if further processing is necessary, such as checking for duplicate content in the message, checking for alternative content in place of the message, determining if a different source of the information is necessary, etc. The message is forwarded to the system 24 for the additional processing if the controller 56 determines that it is necessary. Messages are parsed prior to being passed through the network. In one embodiment, messages incoming to the controller 56 are parsed and the content in the message is examined and actions are taken to the contents of the message prior to transmitting the message to its destination.

In parsing a message, a first functionality may be to clean-up the message by forcing each character to lowercase and by trimming the whitespace off the beginning and the end of the string. Such syntax may provide $message=strtolower($message) and $message=trim($message). The first function (strtolower) converts the entire string (or message) to lower case. The second function (trim), the whitespace at the beginning and end of the string is removed. At this point, regular expressions (regex) can be utilized to convert the elements of the message into words. These words can be stored and compared against other words. Parsing text in the message may provide traversing through the text, separating the words via white spaces and storing the words into a programming structure, for example, an array of characters.

In this example embodiment, the controller 56 parses through the incoming messages using currently accepted parsing languages, such as the PERL language, which permits the application to sort through the text. The PERL "split" function is used to break-up the line into separate words that can then be further processed as individual words instead of lines or sentences. Other PERL based generators include: Parse-RecDescent which provides the ability to generate on-the-fly recursive-descent parsing, Regexp-Grammars which provides an implementation of the future PERL-6 grammars, Parse::Yapp which can be compared with the well-known 'yacc' parse generator tool, Parse::Eyapp—an extended version of Parse::Yapp including new recursive constructs.

Figure 6:
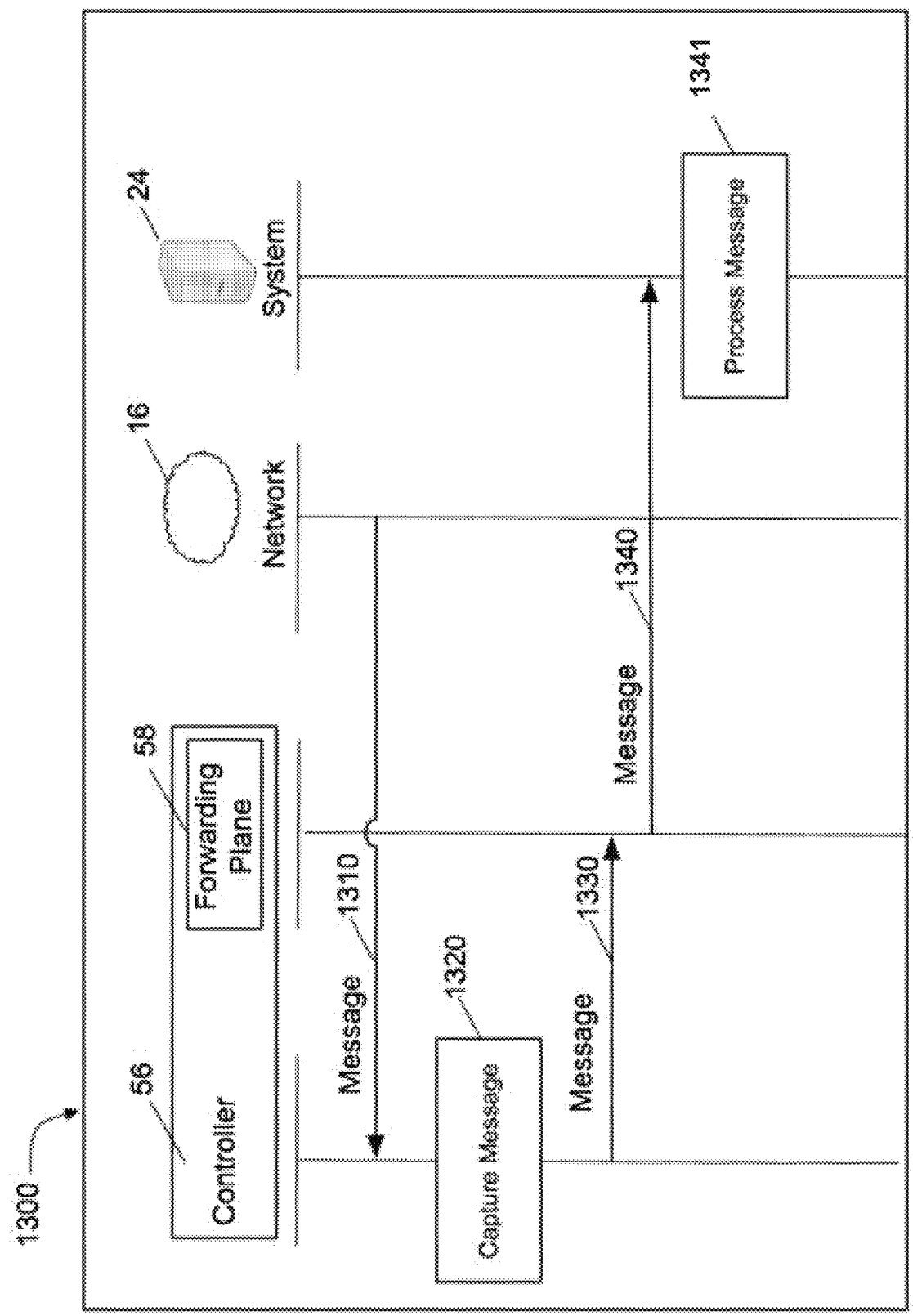
FIG. 6 illustrates an example system signaling diagram according to an example embodiment of the present application.

FIG. 6 is a system configuration message flow of a possible implementation of the current application 1300. A message is received from the network 16 at the controller 56. The controller 56 can reside inside the client device 18/20/22 or outside of the client device 18/20/22. In the flowchart, the forwarding plane 58 resides inside the controller 56. In another embodiment, the forwarding plane 58 may reside outside of the controller 56 and in communication with the controller 56. Functionality of the control plane can be distributed in the controller 56 and/or in one or more elements in the system diagram 10 and/or any other element containing a processor and memory. This message 1310 can be any type of message. The message 1310 is received at the controller 56 and delivered to the controller 56. The type of message as well as the contents of the message is parsed by the controller 56 to determine if the message is to be processed further or simply passed through to the next stage of message processing.

The controller 56 may determine that the message should be further processed prior to sending onward, the message 1320 is sent 1330 to the forwarding plane 58. The forwarding plane 58 forwards the message 1340 to the system 24 routed through the network 16. This message is forwarded to the system server 24 for further processing 1341 to determine if the message is sent out, the contents of the message, and/or if an alternate message is sent out.

Figure 7:
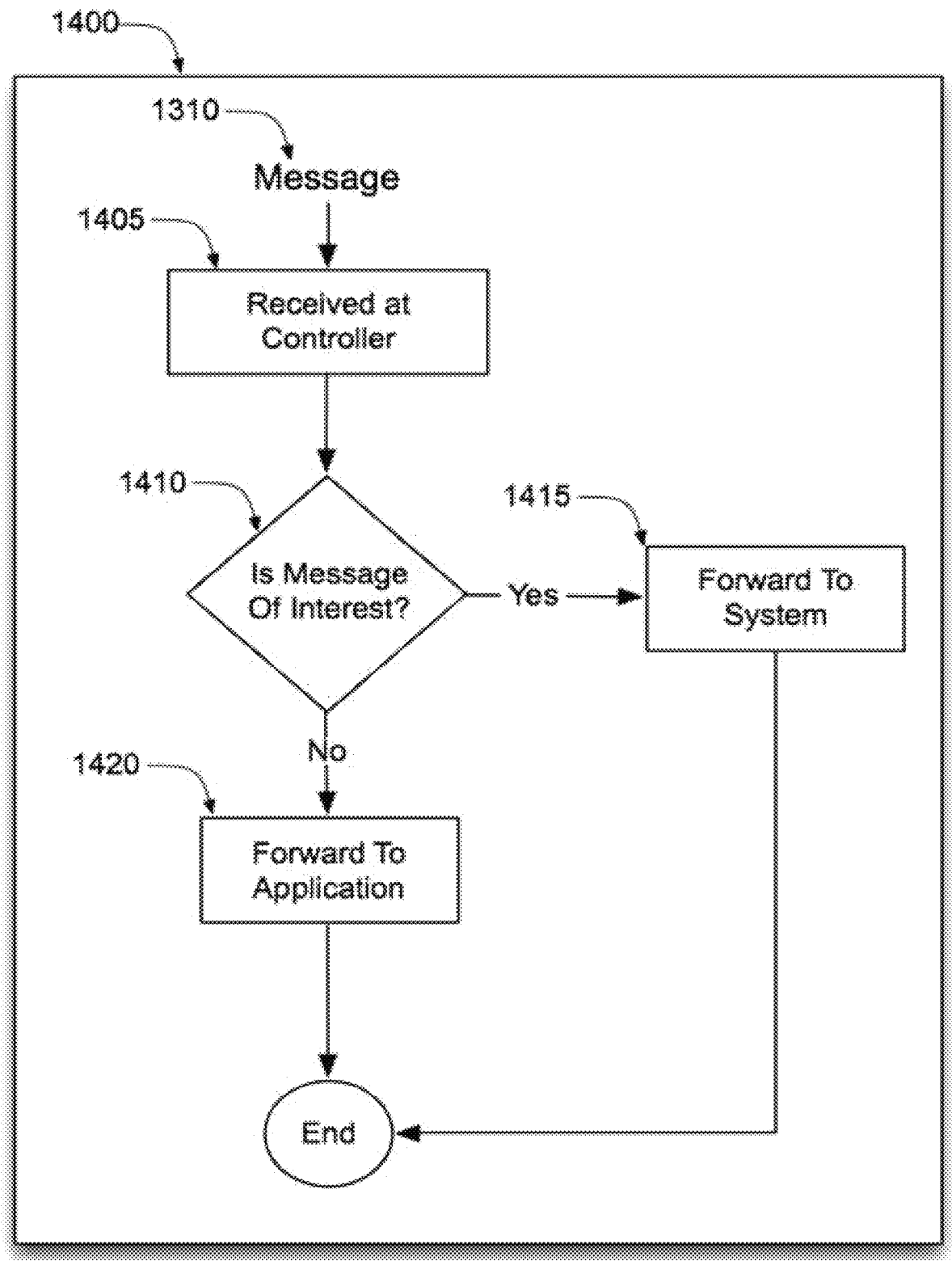
FIG. 7 illustrates an example logic flow diagram according to an example embodiment of the present application.

FIG. 7 is a flowchart of one possible implementation of the current application 1400. Referring to FIG. 7, the message 1310 is received in the controller 56 of the client device 18/20/22 1405. This message 1310 may be a message of a new conversation between the user and one or more remote parties, or it may be a message continuing a previous conversation between them. As a result, a determination is made as to the interest in the message 1410. A message is of interest if one or more of the following conditions exist: the message is part of a current session, the message pertains to a current problem in the system, by a user or users in the session, the message pertains to a new problem or issue in the system, the timeframe of the message compared to the timeframe of the message relating to a release, and/or the message was received regarding an issue that was not related to a product and/or application.

In the first example, the message may be part of a current session with ongoing interaction with one or more other users, for example, voice and/or verbal, text-based, email, any message-based communication and other similar types of communication. For example, the user may be communicating in a chat session with another user through a chat application. This application permits each party to type text such that the other person is able to view the text and respond in a same of similar manner. One of these messages being sent from the user would be a message of interest because the message is in a current communication process with another person. In the second example, a user or users may relate the message to a problem or issue in a session where the issue can be related to the system devices in general or a product and/or application inside the system devices. By example only, a message is received (i.e. via email) indicating an issue related to a particular model of audio equipment: 'DM1002SE'. The organization normally services and sells that particular model of equipment. As such, the message is a message of interest. The matching of product models and words in received messages may be obtained by a list of supported words that reflect products, models, categories, etc., that involve the organization's interests. This list is downloaded to the application upon initialization of the application, and the received messages are compared for any inclusion of matched words to the organization's interests. The application 18/20/22 may interact with the list of organization's interest via messaging with a system server 24, a database 26 or a remote system server 14 in which any of these elements may contain the organization's interest list. In another embodiment, the interest list may reside in the cloud, or the network 16.

In another example, the message may be pertaining to a new problem in the system by users of the system, or users outside of the system. The condition of the problem is considered current according to the amount of time between the time stamp of the message and the time since a product has been rolled-out or other event criteria. In yet another example, the message is related to a release of a product and/or an application, an update to a product and/or an application, a received message, for example, an email related to the release of a product and/or an application. The message may be related to a specific release of a product, the product in general, or the environment in general. In the fifth example, the message is regarding a problem or issue not specifically related to a product and/or an application.

If the message is determined to be of interest, the message is sent to the forwarding plane 56 where an incoming message 1330 is sent to the system server 24 routed through the network 16 for further processing. The incoming message 1330 contains at least one of the following elements: message contents, message type, time stamp, originator(s), originator(s) device(s), recipient(s), intended recipient(s), recipient(s) device(s), subject, message contents, forwarded, category, Link ID.

A list of the message contents in one example of the current application may include the message type containing the type of message and/or a source of the message. For example, if the message is an SMS message of any source, the type would be "SMS". If an email message is identified, the message type would be "Email". If it is a voice message, the message would be "Call" type. If the message is a SKYPE message, the message would be "Skype". This permits the stored message to be sorted accordingly and permit for easier processing when messages are queried and/or sorted.

The time stamp is the time that the message was received at the controller 56. This permits the message to be sorted based on time and further permits subsequent messages to be compared against the previously received messages to ascertain the priority of later messages as they relate to the originally received message. The originator(s) and recipient(s) are the parties in the conversation of the sent or received message. The originator(s) device(s) and recipient(s) device(s) are the devices that are being utilized by the originator(s) and recipient(s) to interact with the application. The intended recipient(s) are the recipient(s) that the user intended to be the recipient(s) of the message. The subject is the subject of the message. The subject may be obtained from a field in the message and/or the contents of the message if provided, such as an email message contents. The subject may be determined once the message is parsed and the subject can be stored as a separate field in the system server 24 and/or the database 26.

The message content is the text portion of the message. This is the component of the message that is parsed prior to being stored or optionally stored in the system server 24 and/or the database 26. The content of the message is analyzed once parsed for keywords or phrases that help the application to gain an understanding of the nature of the message.

The forwarded indication is an indication reflecting if the message has been propagated to the proper entity within the organization. It is utilized in the case where multiple messages are received regarding the same or similar problem or issue. At least one of the following types of messages are propagated onward in the message forwarding system functions: the first message, a message that has certain content, a message that is based on the originator(s) and/or the recipient(s), the devices of the originator(s) and/or the recipient(s), only the first message stored in the system 24/database 26.

The category is a field that can be implemented as an enumeration type containing the category. In one embodiment, the category can be set to "Question" if the message relates to an issue or question in the product. In another example, the category can be "Answer" if the message relates to an answer to a previously received question. In another embodiment, questions can be linked to predetermined and pre-stored answers stored in the system 24/database 26 by programming functionalities to utilize programming structures and components to both logically and programmatically store the relationship between the questions and their linked answers. Many different programming aspects can be utilized to perform this functionality. For example, multiple levels of categories can be utilized with keywords be used to link the messages together and for subsequent search operations.

A 'link ID' may be provided that is implemented by a string of characters permitting the messages to be linked together. This aids in the linking of messages that are related together and stored in the system server 24/database 26. The link ID may be generated from the system server 24/Database 26, or may be generated outside of these entities.

Figure 8:
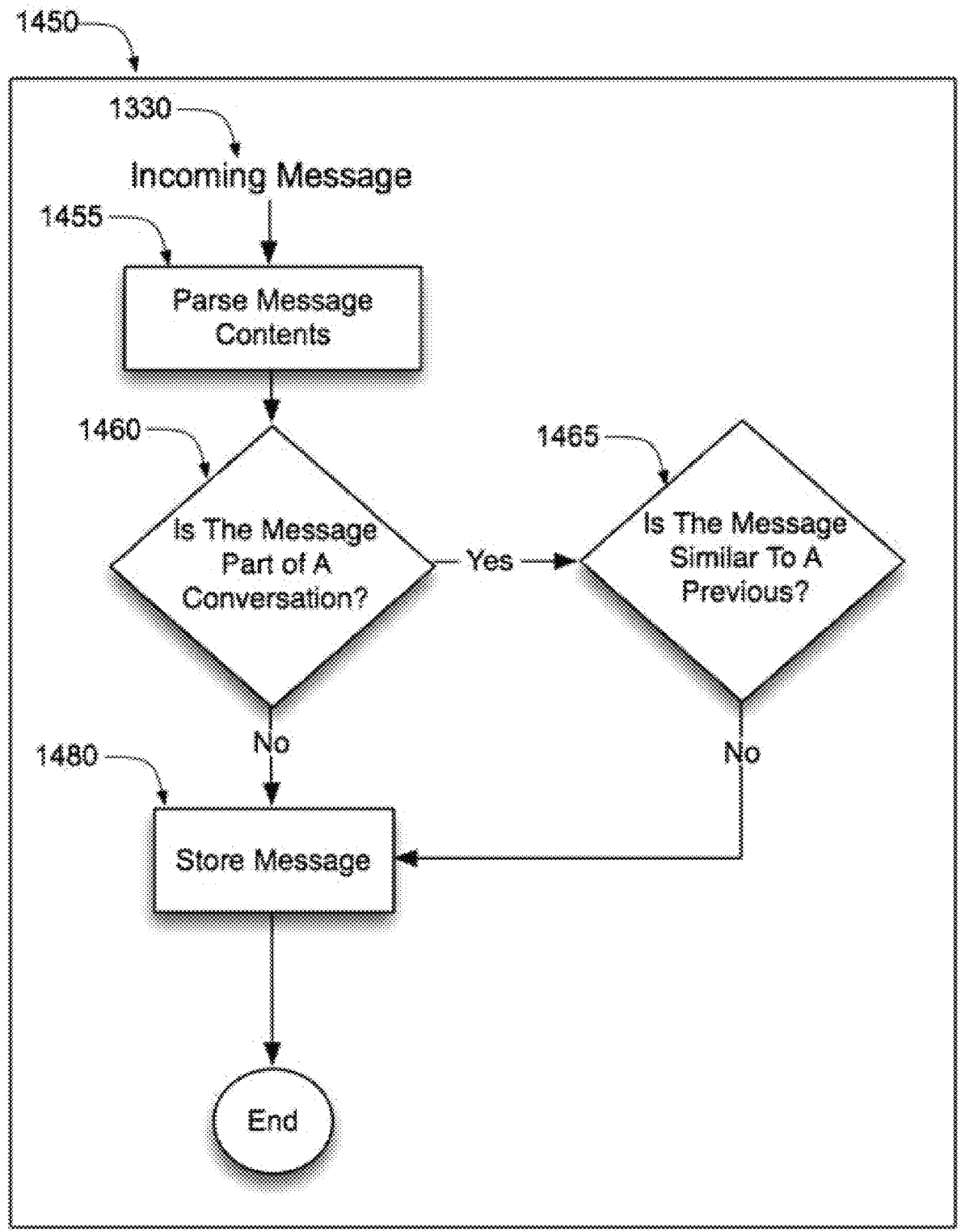
FIG. 8 illustrates another example logic flow diagram according to example embodiments of the present application.

FIG. 8 illustrates a flowchart 1450 of one possible implementation of the current application. The flowchart describes the functionality in the system server 24 and the system server 24 receives a message 1330 sent from an external element. The contents of the message 1330 are parsed 1455 permitting the system server 24 to traverse through the contents of the message. In one embodiment, a check is performed to determine if this message is part of an already ongoing conversation 1460. This can be determined by comparing at least one of the parts of the message to other stored messages in the system server 24. If the message is not currently part of a conversation, then the message is stored for future use 1480 in the system server 24 and the process ends. The stored message can be internal to the system server 24 or in a coupled database 26.

The stored message may be utilized at a later time by the system server 24 as all messages received related to a given issue can be obtained to determine statistics related to the present issue. If the message is part of a current conversation, then the previous conversation elements are parsed to determine if the current message is the same or similar to other elements in the conversation 1465. This is implemented such that a predetermined number of words exist in the previous element or a phrase or phrases exist in the previous element. If the message is not similar to a previous message, then the message is stored in either the system 24 or the connected database 26 and the process ends. If the message is similar to a previous message, then the system server 24 attempts to obtain content from a "Trusted Source".

A "Trusted Source" is a data source or third party data source that is known and/or trusted by the entity. For example, a list of sources is determined where the APIs or other mechanisms that achieve the same or similar results are utilized to obtain content from the source. These sources reflect the topic of the message. For example, trusted professional sources in areas of software and hardware, trusted sources in the area of investments (i.e., 401k sources, stocks source, bonds, IRAs, etc.), other professionals in the business area related to the business organization, etc.

The content is then obtained from the trusted source and a message is generated and sent to the client device 18/20/22. For example, a business may be deploying a software package. More specifically, the IT department of an organization may be attempting to deploy software. The software can be a business application such as 'Human Resources', 'Sales', etc. As messages are received from users, problems or issues may arise such that problems are experienced by the users. These problems are received via messages that are sent from the client devices 18/20/22. The messages are routed to the controller 56 which processes and verifies that duplicate or near duplicate messages are not forwarded but optionally stored. This functionality provides assistance with situations where many people report a common problem and personnel receives duplicate messages (i.e., "my Internet is broken", "I can't access the web", "I can't get to any websites".

Continuing with the software upgrade examples, the software may begin to automatically update on the user machines and questions begin to be received in the application. These questions are received in the form of messages sent through the software. The message can be in the form of voice and/or verbal, text-based, email, other message-based communications. The messages are received in the controller 56 and are processed. These messages are pertaining to a specific aspect of the software, for example, in the case of a benefits-related software from the human resources department a question can relate to deductibles payable by the employees related to the benefit's software.

As an example, User A 18 sends the message of a question related to deductibles. In the controller 56, if the message pertains to the benefits package, it is not passed through but processed as a higher priority message as it is pertaining to the software currently being rolled out. The identification of the message as a current issue or current event (i.e., software roll-out) would automatically elevate the message(s) priority resulting in a different course of treatment for the message. In another embodiment, the message can be placed as a higher priority based on other actions, as any of the fields of the message can be used to compare the contents of the message and cause the message to be processed as a higher priority when the message content is identified as higher priority.

The time stamp of the message is compared to the time stamp of the software rollout, and if the delta falls within a predetermined time threshold ($T_{th}$), (e.g., 1 hour, 1 day, 2 days, etc.), then it is understood that the message is related to a current rollout of software, thus it is placed at a higher priority. As further explained, there are three timestamps: 1) Message Time (MT)—the timestamp of the received message, 2) Roll-Out Time (ROT)—software roll-out timestamp or the timestamp of the delivery of the software to the customer, 3) Current Timestamp (CT)—the current time.

Further, a threshold time (Tth) is the amount of time past the ROT that is considered a higher priority: if [MT<=ROT+ Tth].

The amount of time delta between the software rollout and received messages is set in the configuration portion of the application such that the user is able to predetermine the amount of time that received messages are deemed a higher priority. For example, the user is able, through the configuration portion of the application, to determine that messages within a certain timeframe (hours, days, weeks, etc.) related to the rollout of the software should be placed as a higher priority.

The messages are parsed and stored as a higher priority message in the system server 24 connected to the controller 56. In another embodiment, the messages are forwarded to a database communicably coupled to the system server 24. The stored messages are time-stamped when stored to be able to obtain the time the message was received. In another embodiment, the stored messages may be presented to the users at a later time. Priorities may vary [$P_1, P_2, P_3 \ldots P_N$]. The time thresholds may be numerous and may include multiple instances of time thresholds [$T_{h1}, T_{h2}, T_{h3} \ldots T_{hN}$] corresponding to the various priority levels where each threshold represents more time added from the previous threshold level.

In another example, assume that User A has a question related to the benefits software recently installed on user's devices, or an issue where the user does not understand a portion of the software, or a portion of the software does not appear to be working. For example, the functionality associated with a button component does not seem to perform correctly.

The first message related to the button problem is passed through to the node 60, which is received by the IT department and data is sent to the system server 24 to indicate that the problem related to the button component has been reported. Furthermore, the message is stored in the system server 24/database 26 with the forwarded indication set such that future, similar messages are not forwarded onward. The forwarded indication is an indication in the database that is stored in the same row as the stored message. This indication permits the software to determine if the issue has been reported. If the indication is set, (i.e. the forwarded bit set) then duplicate or similarly duplicate messages are not forwarded on but simply stored in the database. As the forwarded element in the stored data is a bit, if the bit is set to the value of "1", or higher, this reflects that the message has been forwarded correctly and there is no need to repeat the forwarding of this message which, in turn, minimizes duplicate messages being sent. In another example, the software may execute a process to query the database for duplicate messages such that the number of instances is recorded for each duplicate message that resides in the database. This number can be stored and utilized to determine how many duplicate messages have been received. The software may query those messages and the forwarded bit is set high, or to the value of "1".

All other messages are processed by the controller 58 and compared to the previously stored messages. If the new message relates to the button issue and is the same or similar to the previous message, it is not forwarded to the node 60 but stored in the system server 24/database 26. Only one message needs to be forwarded onward for a common group of messages, all other messages are stored with a time stamp in the system server 24 and counted and tallied to keep track of the magnitude of the problem. If the IT department desires, they can obtain the number of messages received pertaining to the button issue by accessing the system server 24 and/or the database 26.

In another example, a user may transmit a message through the application regarding questions on the action of a component on the GUI of the application. For example, a button entitled "More" does not perform any functionality when pressed by the user's pointing device and the user is concerned about this error event. The message is forwarded to the proper department in the organization, for example, the IT department. The message is also stored in the system server 24/database 26 with the forwarded indication set to true.

Other, similar messages related to the button issue is not forwarded on but simply stored in the system 24/database 26 as the forwarded indication is set in a message that is the same or similar to the incoming message. Other components of the message can be compared and processed different, for example the originator(s), the recipient(s), the timestamp, etc. A solution to the issue is then received and sent to the originator (or originators) of the initial question or issue. The user and/or other users have the ability to flag this response message as the solution to the initial question or issue. This occurs via the GUI of the application on the client device 18/20/22. This functionality can be included in the GUI portion of the application as a component, for example, a checkbox component can be included on the GUI such that the user can easily indicate that the response to the message is the solution to the question or issue.

When the user indicates that the solution is provided, a message is sent to the controller 56 and the solution is stored in the system server 24/database 26. The category for the message, for example, in this case is "Answer" and the message is linked to the original message through a linking mechanism, such as the link ID field of the message. Having the linked, stored answer to the issue permits the controller 56 and system server 24 to automatically provide answers to questions that are received pertaining to the same button issue. The controller can automatically send response messages to questions received without having to forward the question to the proper entity, for example, the IT department.

In another embodiment, any time in the future, when the same or similar message is received regarding an event that was previously deemed as a higher priority, this message will also be processed different as the issue was originally deemed as a higher priority. In this example, additional processing is performed, for example a stored answer is automatically shipped to the sender of the message. In another embodiment, at a later time after the initial issue is processed, if the same or similar issue is received, the person who originally supplied the verified or non-verified solution is referred to the person or entity that raises the issue again. The contact information of the person who provided the solution is provided to the user bringing up the issue as the solution has already been processed through the system.

Figure 9:
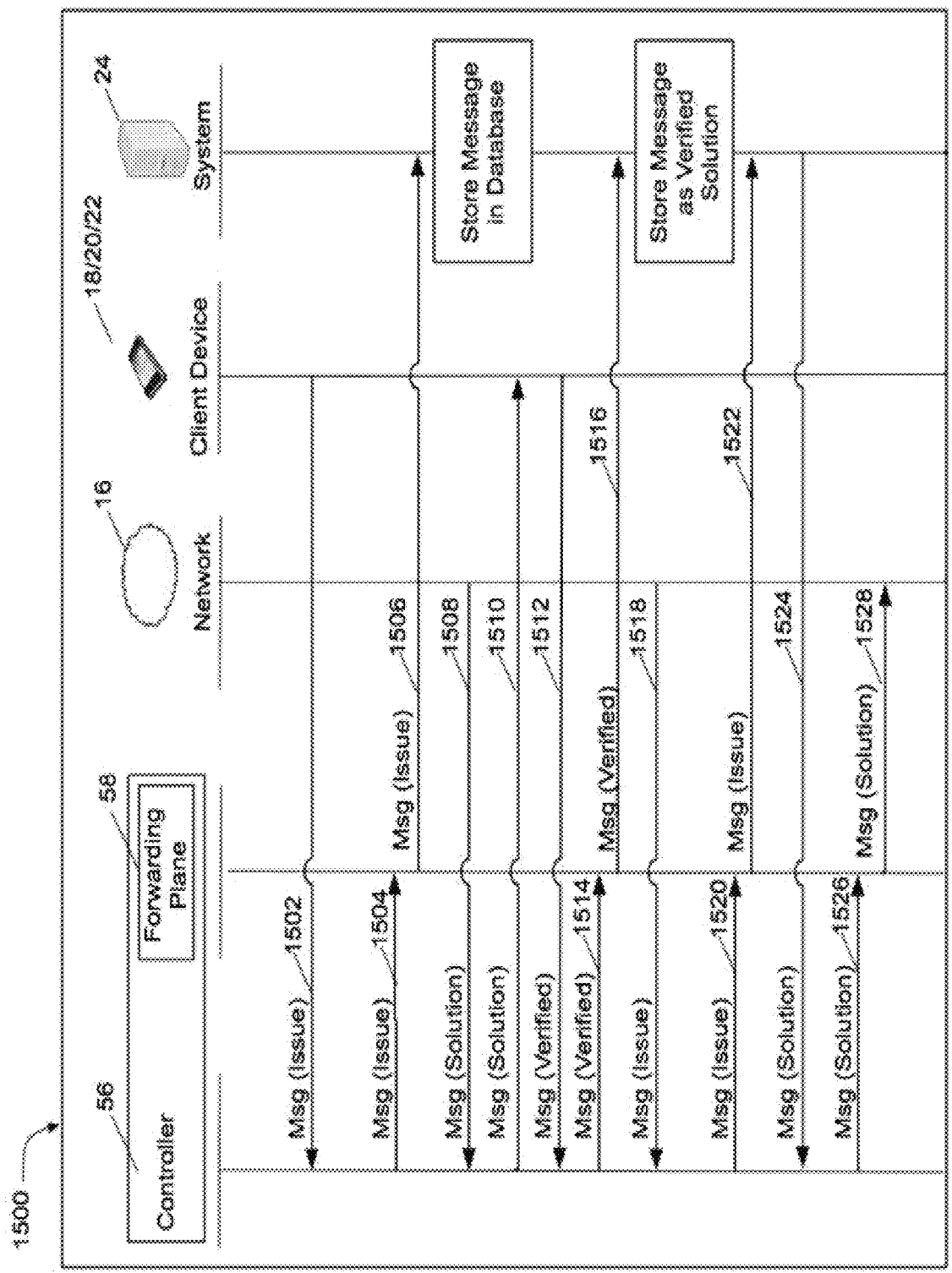
FIG. 9 illustrates yet another system signaling diagram according to example embodiments of the present application.

FIG. 9 illustrates a message flow 1500 of one possible implementation of the current application. As an overview of the message flow, a user using the client device 18/20/22 is the user that is initially sending the message with the issue which is stored in the system server 24/database 26. The solution is received from the network 16 from another user wherein it is verified by the same user before being sent to the system server 24/database 26 as the solution to the original issue. Finally, the same or similar issue is received by another user as indicated by a message received from the network 16 and the message is forwarded to the system server 24/database 26. Finally, the solution is sent to the network 16 and finally to the user who sent the message with the same issue.

To further clarify, a message 1502 is received in the controller 56 from a user, for example, user A on a client device 18/20/22. This message is parsed to determine the content of the message as described in the various examples of this disclosure. This issue identified is regarding an issue of operation within the current application being utilized on the user device, or in other examples, an issue outside of the current application. The controller 56 determines that the message is a new message not pertaining to an existing session and forwards the message 1504 to the forwarding plane 58 where it is then forwarded 1506 to the system server 24/database 26. The system server 24/database 26 stores the message along with the message components. The storing of the message also includes elements such as the message type and link ID such that functionality further processed permits the message to be obtained and compared to determine if a further message relates to this message. In another embodiment, the message may be sent forward to all users in the system such that all users are able to view the issue and possibly provide input such as solutions to the issue (not depicted).

Continuing with the same example, a message is received from another user 1508 offering a possible solution to the issue. This message is received in the controller 56 where it is sent 1510 to User A's client device 18/20/22 for verification that the solution is indeed the correct solution to the issue originally surfaced. User A verifies that the solution is the correct solution to the issue and sends a verified message 1512 that is received in the controller 56. Alternatively, the user's device 18/20/22 may perform an automated solution approach that matches the parsed terms in the message inquiry and message responses to known solution results and confirms the known solutions as correct prior to providing any verification. The controller 56 forwards the message 1514 to the control plane 58 and the message 1516 is sent to the system server 24/database 26 that is then stored in the system server 24/database 26 as the correct solution to the issue.

Another message 1518 is received from another User B from the network 16 containing the same issue as originally identified from the first message, which is received in the controller 56. The controller 56 parses the message and observing that it pertains to a message that has already been previously processed, forwards the message 1520 to the forwarding plane 58 where it is then forwarded 1522 to the system server 24/database 26.

The system server 24 queries an internal database or the external database 26 and determines that the issue already contains a verified solution and automatically forwards the solution 1524. The solution is sent 1526 to the forwarding plane 58 and is then sent to user B as indicated by the sending of the solution 1528 to the network 16. User B has then received the solution to the issue automatically without notifying external entities of the message containing the issue since that issue has already been identified and the solution already verified by the user that raised the original issue.

In another embodiment, the solution is based on the distribution of a comparison between what is currently trending what users have been selecting as the solution in a given timeframe), and historically what is recommended. The system server 24 can determine the solution from these elements accordingly. For example, let's assume that the current conversation is related to asset distribution and the selection of investment choices for a given individual or group of individuals. The systems server 24 determines that the possible choices are available to the user(s) as: High Yield Bond Fund, Regular Bond Fund, Bond Fund is not recommended, Instead of a bond investment, buy ABC Gold Fund, reduce company stock holding and buy ABC Mutual Fund.

The system server 24 maintains a record of the historical selection of what other people are selecting for their portfolios where the top 5 selections are listed. The proposed solutions as listed in the table are obtained from a number of different algorithms. The historical data function permits for the calculation of the selections (i.e., investment selections) that all users of the application or users outside of the application have made within a predetermined amount of time otherwise referred to as the 'timeframe'.

An alternate data approach is the trending data. In this algorithm, the selection(s) that are currently trending are the most valuable in offering choices to the user. The most recently selected choices would be offered as choices provided from either users of the system and/or users outside of the system. The amount of time to consider the choices made by others is predetermined and is henceforth considered the timeframe.

The timeframe can be set at development time as the application programmer will input a static data point in the application that cannot be altered. The data point can be a specific number of hours, days, weeks, months, years. The timeframe can also be a configurable data point that the user is able, through the configuration area of the application, set the amount of time that the historical data is usable. This data point can be a specific number of hours, days, weeks, months, years, etc. In the past timeframe, the system server 24 determines that according to the historical data of selections selected by others within the predetermined timeframe, the following data values exist: High Yield Bond Fund 0%, Regular Bond Fund 15%, Bond Fund is not recommended 22.5%, Instead of a bond investment buy ABC Gold Fund 8%, reduce company stock holding and buy ABC Mutual Fund 2.5%.

Also, of note and within the predetermined timeframe, other users have made the following trending selections options: 2, 3, 4, 2, 4, 2. The system server 24 can then determine that either selection 3 historical data selection or selection 2 trending data selection should be offered to the user(s) according to historical and trending data within the predetermined timeframe. The system server 24 further obtains the selections from the other users by interfacing with APIs from the application used by the users. Through the APIs, the system server 24 is able to determine the selections of the users and provide selections that are based on the historical and/or the trending data.

Figure 10:
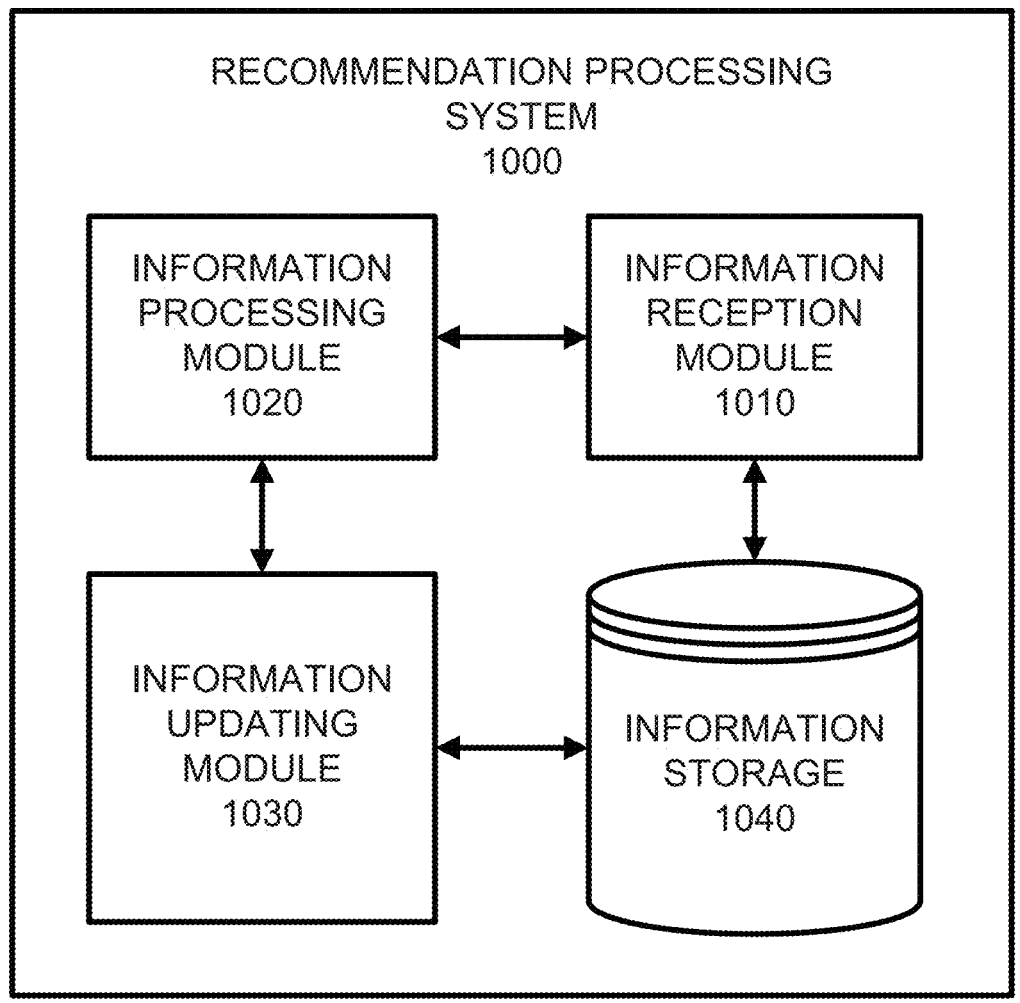
FIG. 10 illustrates a system configuration to perform one or more of the example embodiments of the present application.

FIG. 10 illustrates a notification or recommendation application system configuration configured to perform one or more of the example embodiments of the present application. Referring to FIG. 10, the system 1000 may be a module or device(s) that is configured to perform any of the above-noted operations. For instance, the system 1000 may include an information reception module 1010 that receives information as user data is accumulated based on identified queries, interests or other actions that cause information to be received and logged in accordance with a user account. The information processing module 1020 is responsible for retrieving the user information stored in memory 1040 and attempting to create user suggestions, notifications and perform subsequent processing operations based on the known user initiated operations. The information update module 1030 is responsible for storing in memory the user actions and changes to user information that may occur from known user actions, preferences and current interests.

The system 1000 may perform one example method of operation that includes receiving a message from a user device, processing the message to identify message content, determining whether the message should be modified based on the message content, and determining whether the message should be transmitted to its intended destination based on the message content.

Continuing with the same example, processing the message to identify message content may include parsing the message and comparing the message content to previously received message content of previously received messages. The method may also provide identifying a match between the message content and the previously received message content, and blocking the message from being transferred to the destination under certain circumstances. Also, the processor may perform identifying at least one item of interest in the message content, and storing the message with other previously received messages of interest. The at least one item of interest may include a current network session, a current network problem, a new network problem, a timeframe specified by a timeframe parameter, and a product defect. The message content may also include at least one of a message type, a timestamp, an originator address, a destination address, a subject field, message data, message category and a link identifier. The method may also include identifying the message is a first message of a particular message type, and transmitting the message to its intended destination.

Another example method that may be performed by the system 1000 may include a method that includes receiving a message from a user device at a network server, processing the message to identify message content, identifying a current event being hosted by the network server, and determining a message priority to assign to the message based on the message content and the current event. The method may also include identifying a time stamp corresponding with a time the message was created and identifying a time frame assigned to the current event and comparing the time stamp to the time frame to determine whether there is overlap between the time stamp and the time frame. In examining the times, the method may also include determining there is overlap between the time stamp and the time frame, and increasing a priority of the message based on the identified overlap. Also, the method may provide parsing the message, and identifying the message content is related to a problem associated with the current event. Additionally, the method may include assigning the message priority to the message, and storing the message in a priority message queue associated with the assigned priority. Processing the message to identify message content may also include comparing the message content to previously received message content of previously received messages. The method may also include identifying a match between the message content and the previously received message content, and blocking the message from being transferred to the destination.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 11 illustrates an example network element 1100, which may represent any of the above-described network components, etc.

Figure 11:
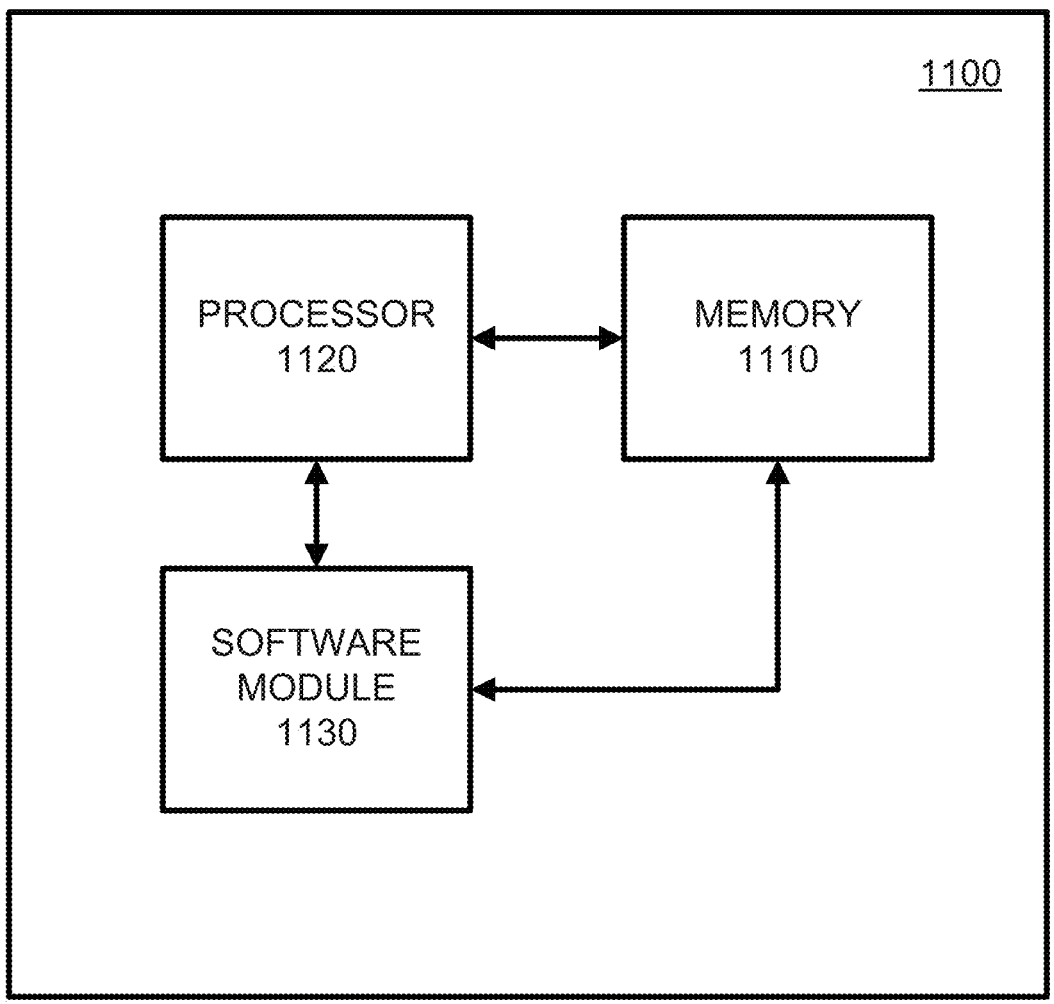
FIG. 11 illustrates an example network entity device configured to store instructions, software, and corresponding hardware for executing the same, according to example embodiments of the present application.

As illustrated in FIG. 11, a memory 1110 and a processor 1120 may be discrete components of the network entity 1100 that are used to execute an application or set of operations. The application may be coded in software in a computer language understood by the processor 1120, and stored in a computer readable medium, such as, the memory 1110. The computer readable medium may be a non-transitory computer readable medium that includes tangible hardware components in addition to software stored in memory. Furthermore, a software module 1130 may be another discrete entity that is part of the network entity 1100, and which contains software instructions that may be executed by the processor 1120. In addition to the above noted components of the network entity 1100, the network entity 1100 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the systems of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the FIG.s herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   receiving a message from a user device at a network controller;
   determining, by the network controller, whether the message should be modified based on content of the message;
   filtering, by the networking controller, the message content if it includes information considered to be uninteresting;
   modifying the data based on user preferences if the network controller determines the message should be modified based on the message content;
   determining, by the network controller, whether the message content relates to a particular issue;
   forwarding, by the network controller, a first message that relates to the particular issue to a first predetermined storage location;
   forwarding, by the network controller, subsequent messages that relate to the particular issue to a second predetermined storage location;
   accumulating, by the network controller, a quantity of the stored subsequent messages that relate to the particular issue;
   generating, by the network controller, a solution to the particular issue when the quantity of stored subsequent messages exceeds a threshold quantity; and
   providing the solution to one or more user devices associated with the particular issue.

2. The method of claim 1, wherein processing the message to identify message content comprises parsing, by the network controller the message and comparing the message content to previously received message content of previously received messages.

3. The method of claim 2, further comprising:
   identifying, by the network controller a match between the message content and the previously received message content; and
   blocking the message from being transferred to the destination.

4. The method of claim 1, further comprising:
   identifying, by the network controller at least one item of interest in the message content; and
   storing, by the network controller the message with other previously received messages of interest.

5. The method of claim 4, wherein at least one item of interest comprises a current network session, a current network problem, a new network problem, a timeframe specified by a timeframe parameter, and a product defect.

6. The method of claim 5, wherein the message content comprises at least one of a message type, a timestamp, an originator address, a destination address, a subject field, message data, message category and a link identifier.

7. The method of claim 1, further comprising:
   identifying, by the network controller the message is a first message of a particular message type; and
   transmitting, by the network controller the message to its intended destination.

8. An apparatus, comprising:
   a receiver configured to receive a message from a user device;
   a processor configured to:
   filter, by the networking controller, content of the message if it includes information considered to be uninteresting;
   determine whether the message should be modified based on the message content;

modify the data based on user preferences if the processor determines the message should be modified based on the message content;

determine whether the message content relates to a particular issue;

forward a first message that is determined to relate to the particular issue to a first predetermined storage location;

forward subsequent messages that relate to the particular issue to a second predetermined storage location;

accumulate a quantity of the stored subsequent messages that relate to the particular issue;

generate a solution to the particular issue when the quantity exceeds a threshold quantity; and provide the solution to one or more user devices associated with the particular issue.

9. The apparatus of claim 8, wherein the processor is further configured to:

parse the message; and compare the message content to previously received message content of previously received messages, and thereby identify message content.

10. The apparatus of claim 9, wherein the processor is further configured to identify a match between the message content and the previously received message content, and block the message from being transferred to the destination.

11. The apparatus of claim 8, wherein the processor is further configured to identify at least one item of interest in the message content, and store the message with other previously received messages of interest.

12. The apparatus of claim 11, wherein at least one item of interest comprises a current network session, a current network problem, a new network problem, a timeframe specified by a timeframe parameter, and a product defect.

13. The apparatus of claim 12, wherein the message content comprises at least one of a message type, a timestamp, an originator address, a destination address, a subject field, message data, message category and a link identifier.

14. The apparatus of claim 8, wherein the processor is further configured to identify the message is a first message of a particular message type, and wherein the apparatus further comprises a transmitter configured to transmit the message to its intended destination.

15. A non-transitory computer readable storage medium configured to store instructions that when executed causes a processor to:

receive a message from a user device;

filter, by the networking controller, content of the message if it includes information considered to be uninteresting;

determine whether the message should be modified based on the message content;

modify the data based on user preferences if the processor determines the message should be modified based on the message content;

determine whether the message content relates to a particular issue;

forward a first message that is determined to relate to the particular issue to a first predetermined storage location;

forward subsequent messages that relate to the particular issue to a second predetermined storage location;

accumulate a quantity of the stored subsequent messages that relate to the particular issue;

generate a solution to the particular issue when the quantity exceeds a threshold quantity; and provide the solution to one or more user devices associated with the particular issue.

16. The non-transitory computer readable storage medium of claim 15, wherein process the message to identify message content comprises:

parse the message and compare the message content to previously received message content of previously received messages.

17. The non-transitory computer readable storage medium of claim 16, wherein the processor is further configured to:

identify a match between the message content and the previously received message content; and block the message from being transferred to the destination.

18. The non-transitory computer readable storage medium of claim 15, wherein the processor is further configured to:

identify at least one item of interest in the message content;

store the message with other previously received messages of interest identify the message is a first message of a particular message type; and transmit the message to its intended destination.

19. The non-transitory computer readable storage medium of claim 18, wherein at least one item of interest comprises a current network session, a current network problem, a new network problem, a timeframe specified by a timeframe parameter, and a product defect.

20. The non-transitory computer readable storage medium of claim 19, wherein the message content comprises at least one of a message type, a timestamp, an originator address, a destination address, a subject field, message data, message category and a link identifier.

* * * * *